(12) United States Patent
Deshpande et al.

(10) Patent No.: US 11,489,662 B2
(45) Date of Patent: Nov. 1, 2022

(54) SPECIAL RELATIONSHIPS IN A BLOCKCHAIN

(71) Applicant: International Business Machines Corporation, Armonk, NY (US)

(72) Inventors: Pralhad Dinesh Deshpande, Singapore (SG); Raghav Sood, Singapore (SG); Yuan Yuan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 16/117,159

(22) Filed: Aug. 30, 2018

(65) Prior Publication Data

US 2020/0076573 A1 Mar. 5, 2020

(51) Int. Cl.
*H04L 9/06* (2006.01)
*G06F 16/23* (2019.01)
*G06F 16/2458* (2019.01)

(52) U.S. Cl.
CPC ........ *H04L 9/0637* (2013.01); *G06F 16/2379* (2019.01); *G06F 16/2465* (2019.01); *G06F 2216/03* (2013.01)

(58) Field of Classification Search
CPC ............... H04L 9/0637; G06F 16/2379; G06F 16/2465; G06F 2216/03; G06F 16/2365
USPC .......................................................... 707/703
See application file for complete search history.

(56) References Cited

U.S. PATENT DOCUMENTS 9,298,806 B1 3/2016 Vessenes et al.
9,875,510 B1 * 1/2018 Kasper .................... G06Q 40/12
9,892,460 B1 * 2/2018 Winklevoss ........... G06Q 40/04
2016/0189160 A1 6/2016 Katzir
2016/0212146 A1 * 7/2016 Wilson ................... H04L 9/3226
(Continued)

FOREIGN PATENT DOCUMENTS

| CN | 105931052 A | 9/2016 |
| WO | 2017145049 A1 | 8/2017 |
| WO | WO-2018162789 A1 * | 9/2018 ......... H04L 63/0435 |

OTHER PUBLICATIONS

"Reward distribution mechanisms and withholding attacks in Bitcoin pool mining" Jan. 2018 https://www.researchgate.net/publication/329489944_A_survey_Reward_distribution_mechanisms_and_withholding_attacks_in_Bitcoin_pool_mining/link/5c2d53ac299bf12be3a92ecb/download (Year: 2018).*
(Continued)

*Primary Examiner* — Hosain T Alam
*Assistant Examiner* — Nicholas E Allen

(57) ABSTRACT

An example operation may include one or more processing transactions of a plurality of blocks of a blockchain of the blockchain network to determine a user of a plurality of users that is a party of the respective transaction and a mining pool of one or more mining pools that included the respective transaction in the blockchain, performing a statistical analysis of the transactions to determine if the transactions of a user of the plurality of users is distributed across the one or more mining pools in a statistically expected manner, determining that the user has a special relationship with one or more of the one or more mining pools if the transactions of the user are not distributed across the mining pools in a statistically expected manner, and for a user that is determined to have a special relationship, determining one or more of the mining pools with which the determined user has a special relationship.

11 Claims, 9 Drawing Sheets

(56) References Cited

U.S. PATENT DOCUMENTS

| | | | |
|---|---|---|---|
| 2016/0300252 A1* | 10/2016 | Frank | G06F 16/24578 |
| 2016/0342977 A1 | 11/2016 | Lam | |
| 2017/0076306 A1* | 3/2017 | Snider | G06Q 20/325 |
| 2017/0103458 A1* | 4/2017 | Pierce | G06Q 20/381 |
| 2017/0228822 A1* | 8/2017 | Creighton, IV | G06Q 20/3829 |
| 2017/0236123 A1* | 8/2017 | Ali | G06Q 20/3825 |
| | | | 705/75 |
| 2017/0323392 A1* | 11/2017 | Kasper | H04L 63/123 |
| 2018/0018590 A1* | 1/2018 | Szeto | G06F 21/6254 |
| 2018/0109541 A1* | 4/2018 | Gleichauf | H04L 67/1097 |
| 2018/0196694 A1* | 7/2018 | Banerjee | G06F 13/1642 |
| 2018/0216946 A1* | 8/2018 | Gueye | G06F 3/04817 |
| 2018/0247191 A1* | 8/2018 | Katz | G06Q 20/12 |
| 2018/0365688 A1* | 12/2018 | He | G06Q 20/401 |

OTHER PUBLICATIONS

Mauro Conti et al., A Survey on Security and Privacy Issues of Bitcoin, arXiv:1706.00916v2 [cs.CR] Jul. 5, 2017, https://arxiv.org/pdf/1706.00916.pdf.

Michael Fleder et al., Bitcoin Transaction Graph Analysis, Article Feb. 2015, ResearchGate, Source: arXiv, https://www.researchgate.net/publication/271855021_Bitcoin_Transaction_Graph_Analysis, See Abstract.

* cited by examiner

SPECIAL RELATIONSHIPS IN A BLOCKCHAIN

TECHNICAL FIELD

This application generally relates to distributed ledger and database processes, and more particularly, to special relationships in a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

In many blockchain systems, adding a new block to the blockchain requires the solving of a complex mathematical puzzle. This process is often referred to as mining. For example, the puzzle may be to find a cryptographic hash of the previous block in the blockchain, or at least the blockchain header, that is less than a target value.

To "mine" a block requires the mining entity to repeat a hash algorithm while varying a nonce value until a valid solution is found. Mining requires both fast computational power and electricity and thus has an associated cost. The entity that mines the block may be rewarded, e.g. with cryptocurrency and/or with any transaction fees associated with the block. Mining is also competitive with other miners. To enhance the mining entity's chance of successfully mining the next block, the entity may pool computational resources with other miners into a mining pool. The mining pool then shares the rewards amongst its contributors.

The number of transactions that can be included in a block may be limited, for example by the maximum permissible size of the block. When a new block is formed, if the pending transaction queue is less than the maximum allowable size of the block, then all pending transactions will be included in the block. However, if the pending transaction queue is greater than the allowable block size, then the mining pool that generates the block may select which transactions to include in the block. To ensure that a transaction is included, a party that generates the transaction, e.g. a client, account owner, etc., may offer a transaction fee that is payable to the mining entity. Higher fee transactions are more likely to be included in the transaction block. Low value transactions with low fees may therefore need to wait many hours and sometimes days for the transactions to be confirmed by inclusion in a block.

Out of band transaction acceleration is a practice whereby a mining pool could be incentivized, out of band i.e. by something other than the transaction fee, to include the transaction in a block that it has mined. This could be done to accelerate transactions with low fees or to protect against double-spend. Businesses would always want to know if their competitors have any special business arrangements with certain payment processors (miners).

Thus, what is required is a system and method to detect such out-of-band special relationships between account owners and mining pools.

SUMMARY

One example embodiment may provide a method that may comprise one or more processing transactions of a plurality of blocks of a blockchain of the blockchain network to determine a user of a plurality of users that is a party of the respective transaction and a mining pool of one or more mining pools that included the respective transaction in the blockchain, performing a statistical analysis of the transactions to determine if the transactions of a user of the plurality of users is distributed across the one or more mining pools in a statistically expected manner, determining that the user has a special relationship with one or more of the one or more mining pools if the transactions of the user are not distributed across the mining pools in a statistically expected manner, and for a user that is determined to have a special relationship, determining one or more of the mining pools with which the determined user has a special relationship.

Another example embodiment may provide a system that includes a blockchain network comprising a plurality of mining pools and a plurality of users. The plurality of mining pools create blocks containing transactions for the plurality of users and include a created block into the blockchain. The system further comprises one or more of a special relationship detection service module comprising at least one processor and operatively associated memory programmed to process transactions of a plurality of blocks of the blockchain to determine a user of the plurality of users that is a party of the respective transaction and a mining pool of the one or more mining pools that included the respective transaction in the blockchain, perform a statistical analysis of the transactions to determine if the transactions of a user of the plurality of users is distributed across the one or more mining pools in a statistically expected manner, determine that the user has a special relationship with one or more of the one or more mining pools if the transactions of the user are not distributed across the mining pools in a statistically expected manner, and for a user that is determined to have a special relationship, determine one or more of the mining pools with which the determined user has a special relationship.

A further example embodiment may provide a non-transitory computer readable medium comprising instructions, that when read by a processor, cause the processor to perform one or more of processing transactions of a plurality of blocks of a blockchain of a blockchain network to determine a user of a plurality of users that is a party of the respective transaction and a mining pool of one or more mining pools that included the respective transaction in the blockchain, performing a statistical analysis of the transactions to determine if the transactions of a user of the plurality of users is distributed across the one or more mining pools in a statistically expected manner, determining that the user has a special relationship with one or more of the one or more mining pools if the transactions of the user are not distributed across the mining pools in a statistically expected manner, and for a user that is determined to have a special relationship, determining one or more of the mining pools with which the determined user has a special relationship.

DETAILED DESCRIPTION

Figure 1:
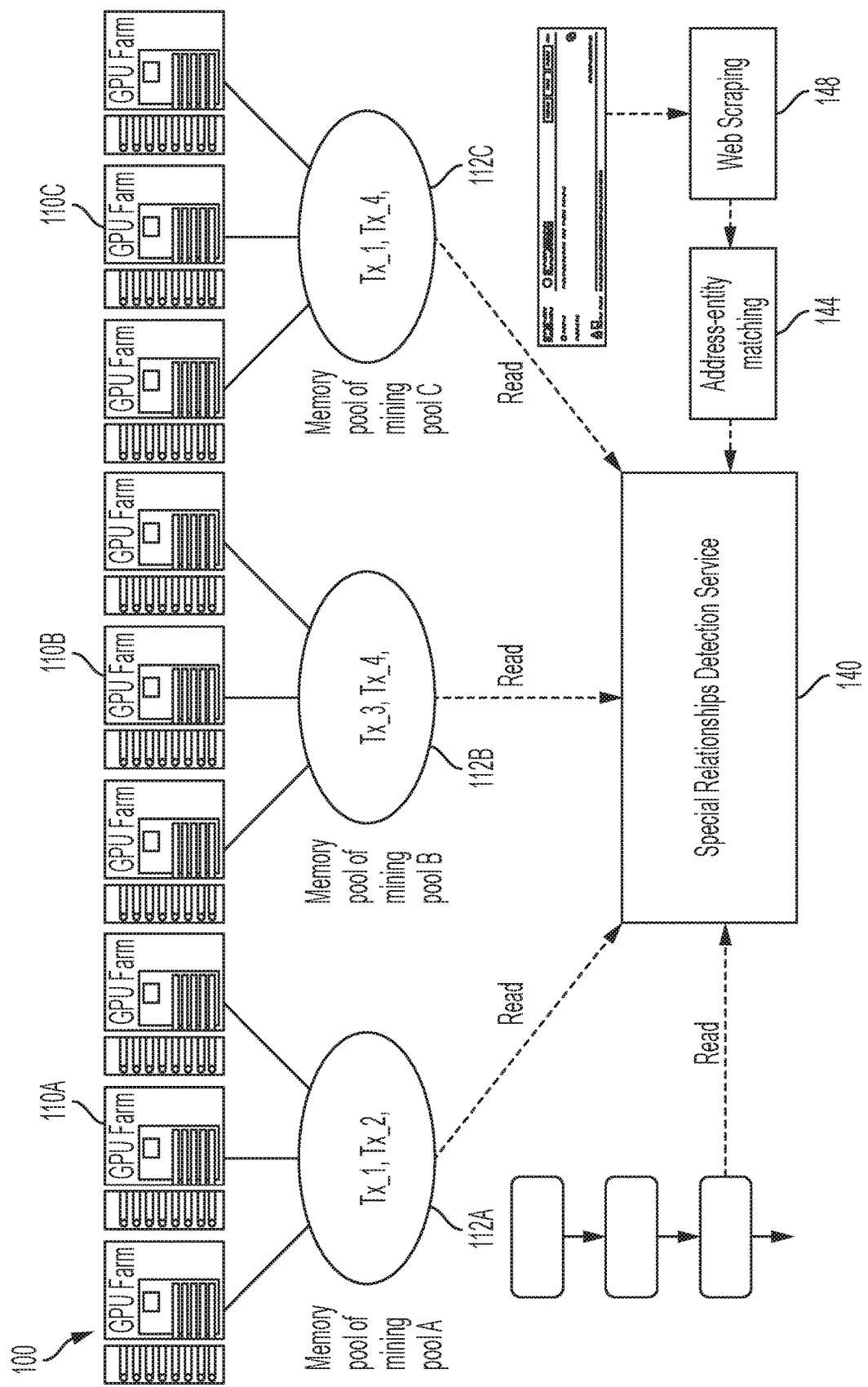
FIG. 1 illustrates a network diagram of mining pools within a blockchain network and relationships detection service, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide a system and method by which special relationships between miners and account owners or clients may be detected.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a network diagram of a set of mining pools for a blockchain network according to example embodiments. Referring to FIG. 1, the network 100 includes a plurality of mining pools 110A, 110B, 110C. Each mining pool has a pool of computational resources for processing blocks of a blockchain network. The mining pools may be based on a number of computing types including, without limitation, central processing units (CPUs), graphics processor units (GPUs) as shown, application specific integrated circuits (ASICs) or other technologies as may be known in the art. Each computing component will have an individual hash rate, i.e. a rate at which the component is able to perform cryptographic hashes in search of the cryptographic hash for a block. The mining pool will thus have a mining pool hash rate dependent on the amount of computing power within the mining pool and the network 100 will have an overall hash rate based on the aggregate of hash rates of all the mining pools 110A, 110B, 110C within the network. The rate at which a new block is solved, or mined, will dependent on the overall hash rate of the network and the "difficulty" in mining the new block. The difficulty is a dynamic parameter that can be adjusted to control the overall rate at which new blocks are mined.

Each mining pool 110A, 110B, 110C may maintain its own memory pool of queued and unconfirmed transactions 112A, 112B, 112C that are the candidate transactions to be used in the next block that is mined by that pool. For example, the memory pool 112A of mining pool 110A is shown as having transactions Tx_1, Tx_2 etc. A client, e.g. account owner, may submit a transaction to the network. The client may submit the transaction universally, i.e. to all mining pools, or to selected mining pools. The client may have negotiated a special relationship with a particular mining pool and therefore may submit the transaction to that mining pool uniquely.

The network 100 includes a special relationships detection service 140. The special relations detection service 140 may include one or more processors and operatively associated memories. The memories may store application code that can be executed by the processors. The application code may include code for processing a number of inputs, applying one or more calculations to the inputs, and producing an output that indicates special relationship information.

The special relationship detection service 140 may be configured to read the memory pools 112A, 112B, 112C of each mining pool 110A, 110B, 110C. The service 140 may also engage an address-entity matching service 144 that uses various techniques, including web-scraping methods 148 to determine the actual entity involved in a particular transaction. The address-entity matching service may produce a table that matches addresses to entity identities.

Figure 2A:
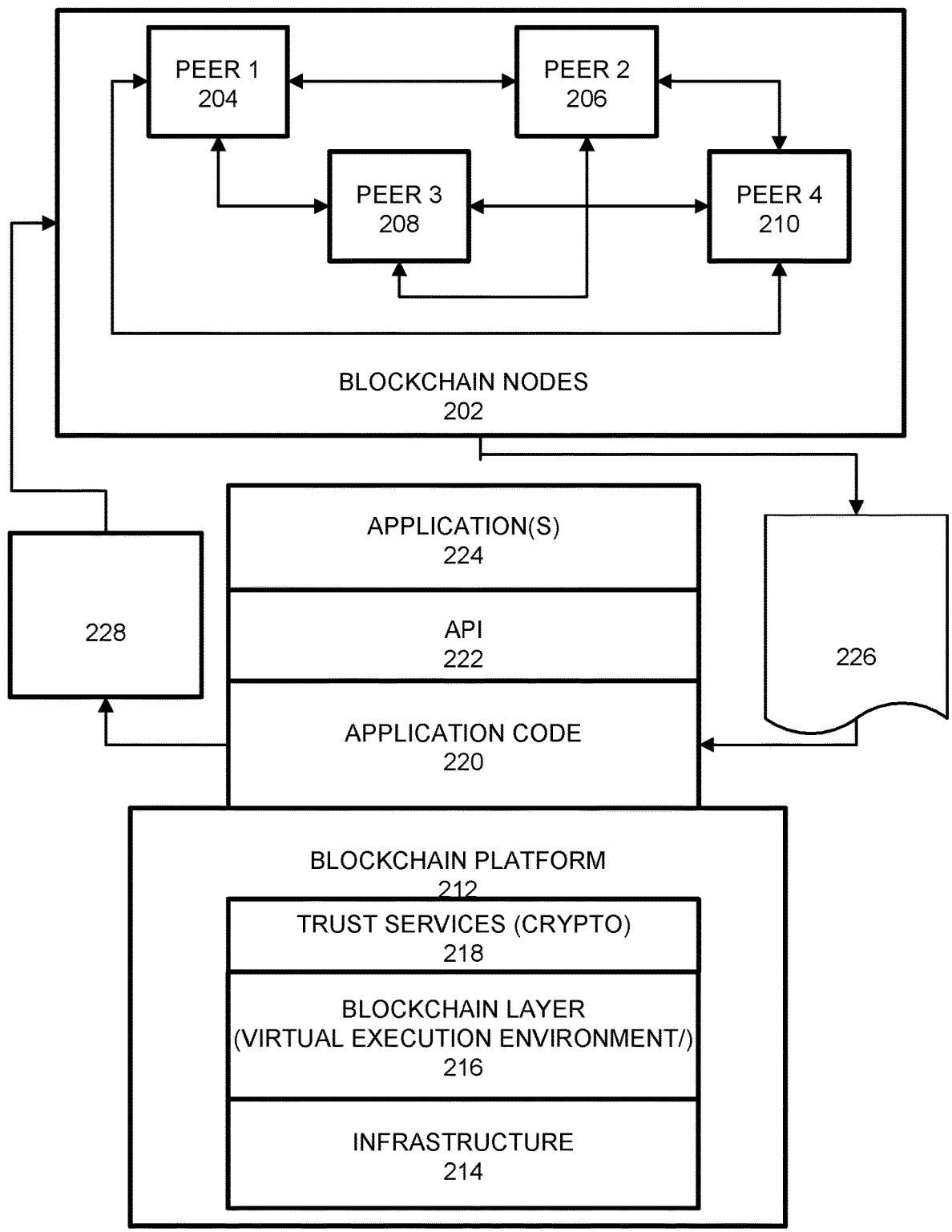
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, transaction information 226 include the transaction parties may be processed by one or more processing entities (e.g., virtual machines) included in the blockchain layer 216. The result 228 may include confirmed transaction information. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a node such as the special relationships detection service may request transaction data, including pending transaction data from the memory pool of a mining pool. One function may be to receive the request and to provide the transactions of the last B blocks of the blockchain to enable the committed transactions from those blocks to be ascertained, the information may be provided to one or more of the nodes 204-210 and/or the special relationships detection service.

Figure 2B:
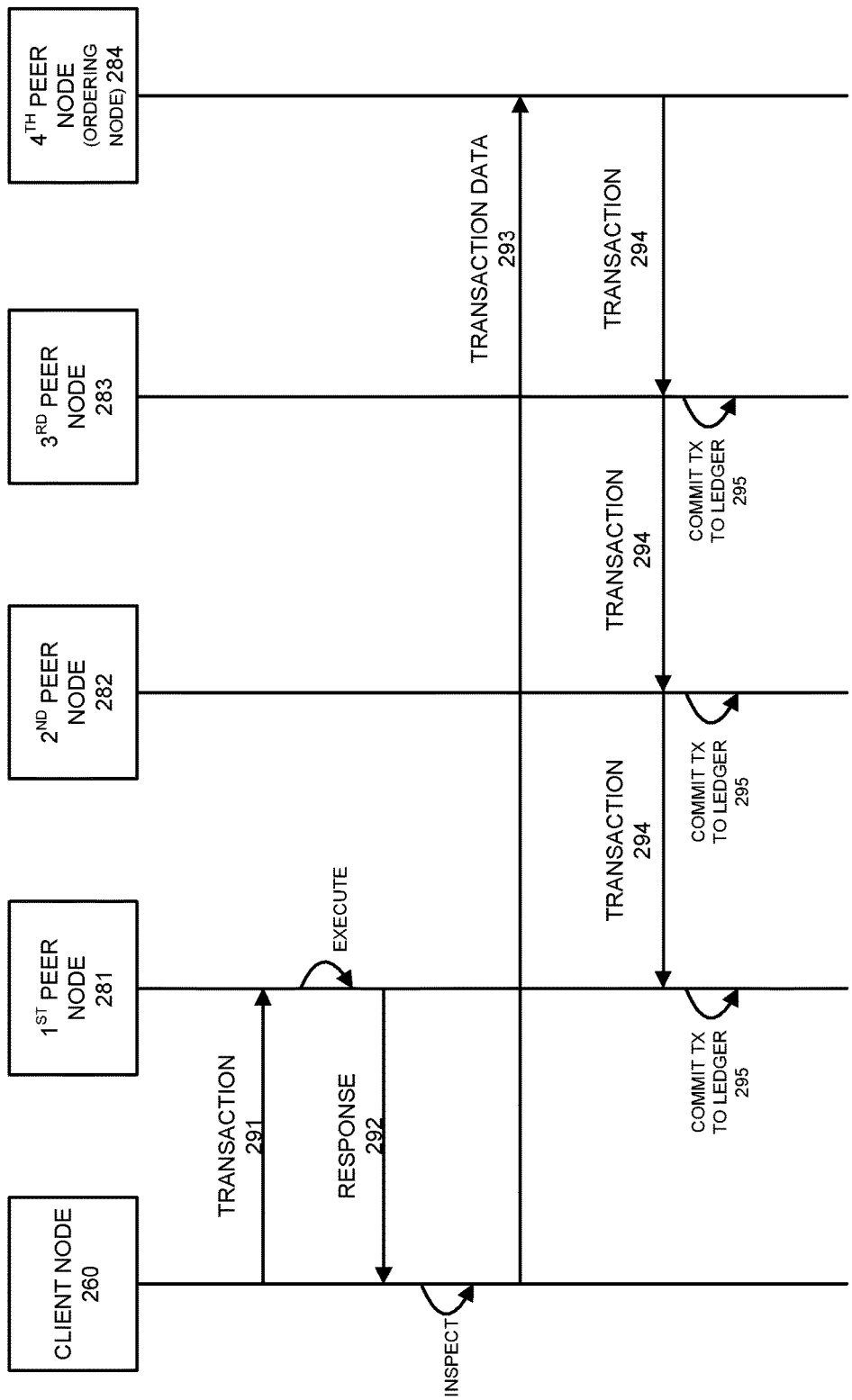
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before commital to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
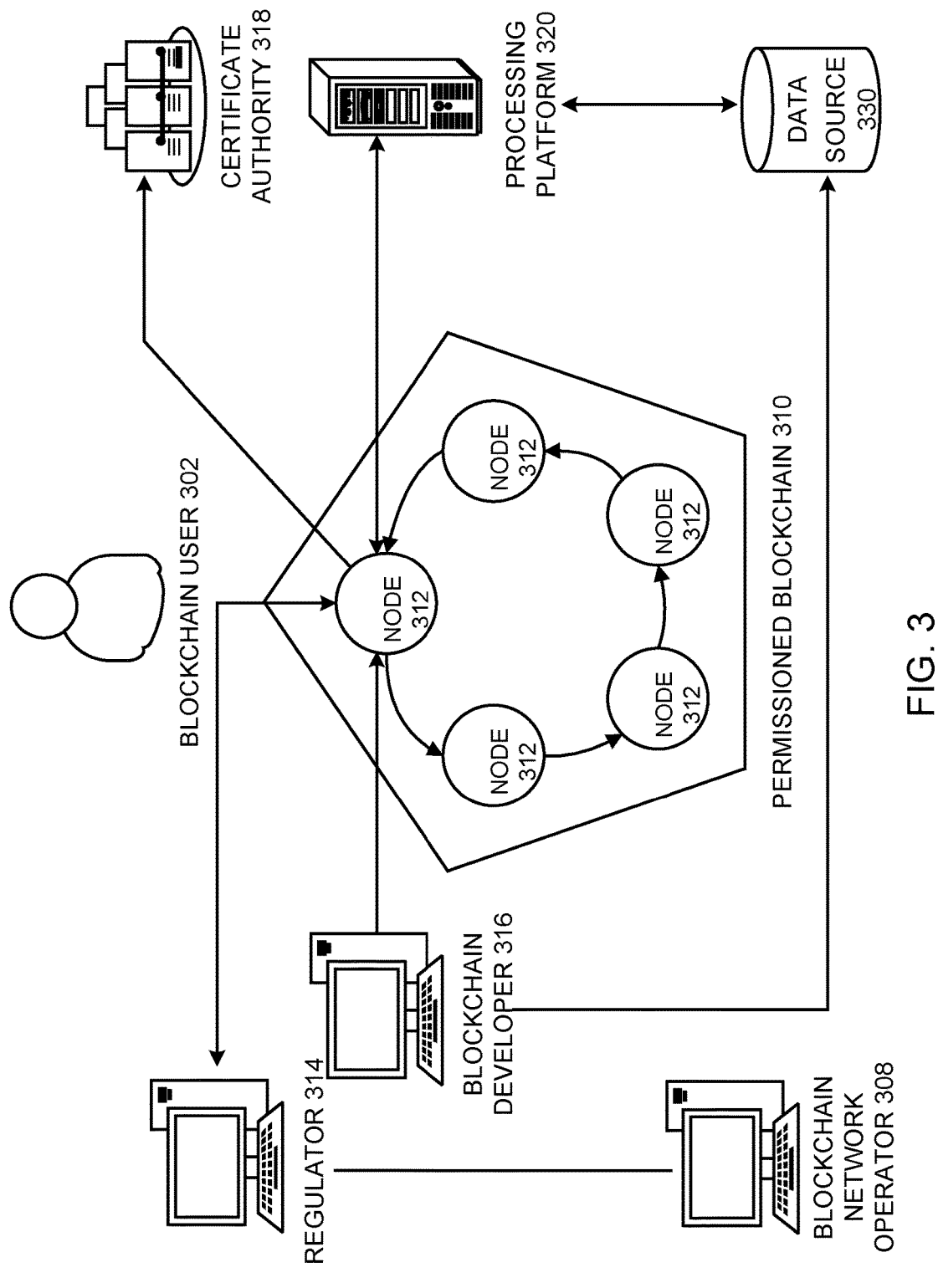
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
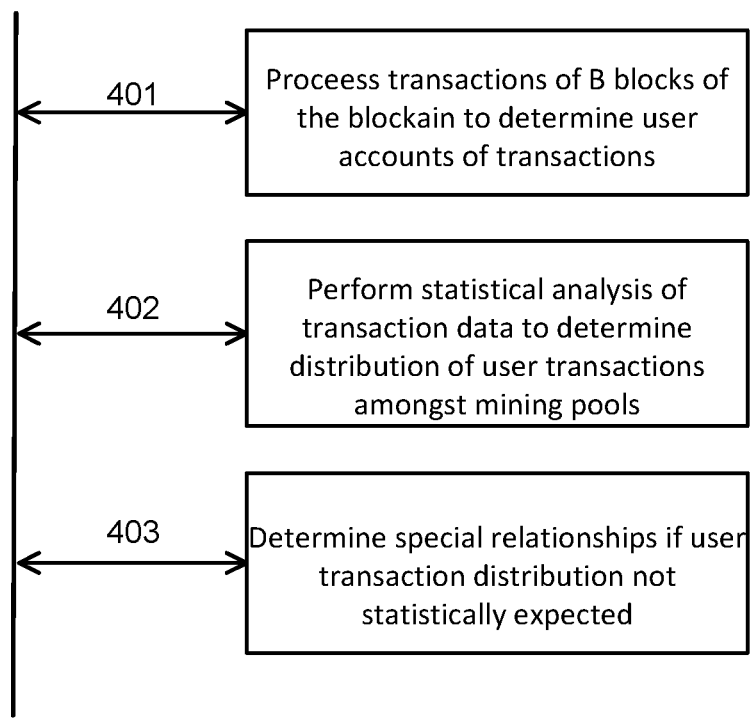
FIG. 4 illustrates a flow diagram for detecting special user/mining pool relationships, according to example embodiments.

FIG. 4 illustrates a flow diagram 400 of an example method of detecting a special relationship(s) in a blockchain, according to example embodiments. For any flowchart shown herein, the process flow will depict a particular order to the steps. The order depicted is not considered to be essential or limiting, and the order of steps may be different in different embodiments. For example, two distinct steps may determine two inputs for a third step. It may not be essential in which order the two input determining steps are performed.

At step 401, the transactions of a plurality of blocks of a blockchain of the blockchain network are processed to determine the user account of the respective transaction and the mining pool that included the transaction in the blockchain. A statistical analysis is then performed on the transactions to determine if the transactions of a user of the plurality of users is distributed across the mining pools in a statistically expected manner (step 402). If the transactions of the user are not distributed across the mining pools in a statistically expected manner, then it may be determined that the user has a special relationship with one or more of the mining pools (step 403).

Figure 5:
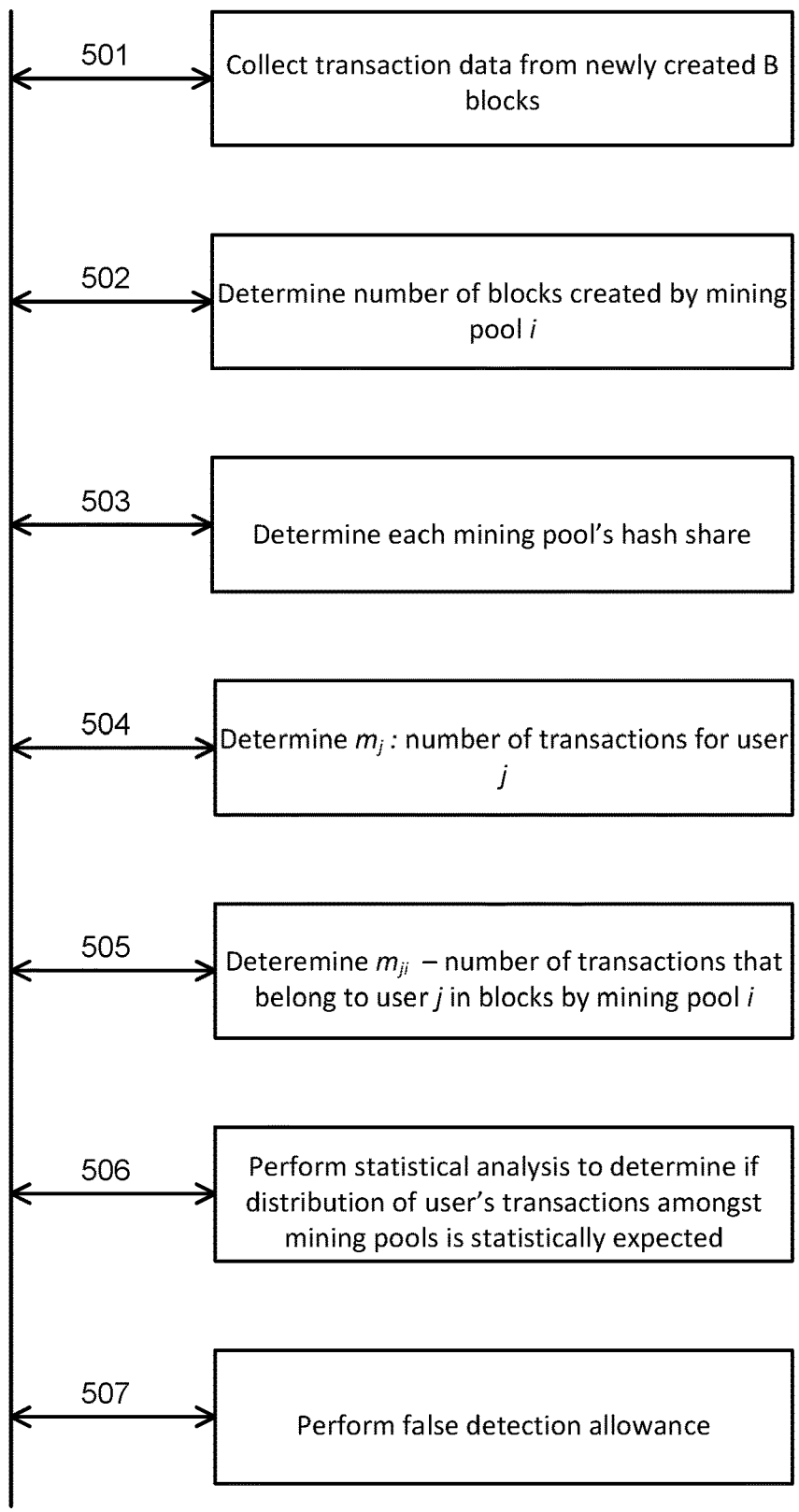
FIG. 5 illustrates a flow diagram of an algorithm used for determining the special relationships, according to example embodiments.

The flowchart 400 of FIG. 4 outlines a methodology in which it is assumed that if all mining pools play fairly for all users, the distribution of any user's verified transactions among pools should be in proportion to the pools' hash power share. An abnormal relationship can be detected if the expected relationship does not hold true. A specific embodiment of the method is depicted in flowchart 500 in FIG. 5. At step 501, the Special Relationship Detection Service 140 collects all transactions from newly created B blocks. The number of blocks utilized may be based on a number, e.g. the last 100 blocks, or a time, e.g. the last 48 hours. The specific number (or time period) of blocks B to be used in the calculation is not considered essential to the broadest embodiments. It is assumed that the last B blocks contain n such transactions. The transactions may be obtained by sending a smartcontract request to inspect the ledger.

At step 502, the number of transactions in blocks created by mining pool i is counted. The number is denoted $n_i$.

At step 503, each mining pool's hash power share $s_i$ is estimated. If there are N mining pools, then the probability of any pool creating a block is proportional to the hash power share of that pool. In one embodiment, the hash power may be calculated for each mining pool ($s_1, s_2, \ldots, s_N$) as a maximum likelihood estimator. If the total number of transactions in the blocks under analysis is n, and out of the n there are $n_i$ transactions included by blocks found by pool i, then the hash power share for mining pool i may be expressed as:

$$\hat{s}_i = n_i/n.$$

At step 504, the transactions m from newly created blocks that belong to user j is determined, which may be denoted as $m_j$.

At step 505, the number of transactions that belong to user j in blocks created by mining pool i is counted, which may be denoted as $m_{ji}$.

From these inputs, a statistical analysis is performed to determine if a particular user's transactions are distributed across the mining pools in a manner that is within expectations (step 506).

In one embodiment, the statistical analysis includes comparing a statistical calculation to a null hypothesis. The null hypothesis, $H_0$ may be that user j has no special relationship with any pool. Under such a hypothesis, it could be expected that the transactions for user $m_j$ would be spread across the mining pools i in direct proportion to the mining pools' share of the overall hash rate. A Pearson's Chi-squared test for each user j may be calculated as follows:

$$\chi^2 = \sum_{i=1}^{N} \frac{(m_{ji} - m_j \hat{s}_i)^2}{m_j \hat{s}_i},$$

where N is the number of mining pools. The $\chi^2$ values can be converted to statistical p-values using a quantile function for a system with N−1 degrees of freedom to reveal a p-value for user j: $p_j$.

The value $p_j$ represents the probability that the observed distribution of user transactions amongst the mining pools matches the null hypothesis, i.e. the transactions are distributed in proportion to the mining pool's share of the overall hash rate. Values of $p_j$ below a particular level may be indicative of a special relationship between a user and a mining pool. In one embodiment, a special relationship may be indicated for $p_j$ values less than approximately 0.05.

The special relationship may be a preferred relationship in which a user's transactions are included in a particular mining pool at a higher rate than expected for that mining pool's hash rate. The special relationship may alternatively be a prejudicial relationship in which a user's transactions are included in a particular mining pool at a lower rate than expected for that mining pool's hash rate.

Optionally, an allowance for false detection may be performed (step 507). The false detection may be based on the Benjamin-Hochberg procedure. For a given false detection rate (FDR) level a, for total K users, their P-values are sorted in ascending order to $\{p_{(1)}, p_{(2)} \ldots, p_{(K)}\}$ to find the largest k such that:

$$p_{(k)} \leq \frac{k}{K}\alpha$$

Users having p-values smaller than $p_{(k)}$ are identified as abnormal users. Example values for $\alpha$ may be 0.05, 0.01, though other values may be used.

Once the statistical analysis has revealed a user to have an abnormal transaction distribution, further analysis for that user can be undertaken to determine the relevant mining pool. For each user k that is deemed an abnormal user, the highest/lowest value of $m_{ki}/\hat{S}_i$ can be used to determine the mining pool i with which the user k has the special relationship. The k-i pair is thus identified as the special user-pool relationship.

The statistical analysis above may uncover specific users that have special relationships with mining pools. However, the user, which may be identified by address in the transaction, may have insufficient information to properly reveal the user. The special relationship detection service 140 may receive additional inputs that enable the service 140 to properly identify the user. In one embodiment, a web scraping service 148 may scrape various digital information sources include forums, social media, messaging platforms, etc. This information may include content that states both a blockchain network address as well as information that can be used to determine the entity identity, such as user names, weblinks, references etc. From this content, the web scraping service 148 generates an address-entity matching table 144 so that the true entity—pool relationship can be determined.

The special relationship detection service 140 may execute across the entire blockchain, i.e. for all users and all mining pools. Alternatively, the special relationship detection service may target a particular mining pool or a particular user.

The special relationship detection service 140 may be implemented in one or more nodes of the blockchain network or may be a standalone node that is able to transact with the nodes of the blockchain network to receive the various inputs discussed above that are used in the statistical analysis algorithms. The special relationship detection service 140 may be a computing node of the blockchain network such as the computer node 700 shown in FIG. 7 and described in more detail below. The service 140 may include at least one processor and at least one memory that is operatively associated with the at least one processor. The memory may include memory for storing data, executable code, statistical algorithms, the address-entity identity table, etc. as well as random access memory for use in the processor operations. The application code may include instruction sets (chaincode) for forming queries to the blockchain for retrieving the blockchain transactions. The service may include a communications module for providing the queries to other blockchain nodes, data sources, etc. and for receiving the returned query responses. The application code may further include instructions sets for processing the transaction data, applying the statistical analysis algorithms, and determining the special relationship data.

In the embodiments described herein, the special relationship detection service 140 queries the ledger and the last B blocks contained in the ledger. In an alternative embodiment, the service 140 may also submit a query to one or more memory pools 112A, 112B, 112C to retrieve the uncommitted or pending transactions contained in the respective memory pool. One or more of the mining pools may make all the uncommitted transactions that are under consideration to be processed visible publicly. Uncommitted transactions will not be included in the statistical analysis but the transactions in the memory pools can be used to indicate a potential special relationship. For example, committed transactions may be compared with uncommitted transactions (whose timestamps are earlier or similar to transactions in the latest block) in the memory pools. If committed transactions have lower transaction fees, then the submitters of those transactions could be suspected to have abnormal relationship with certain pools. These submitters should therefore be included in statistical tests.

Figure 6A:
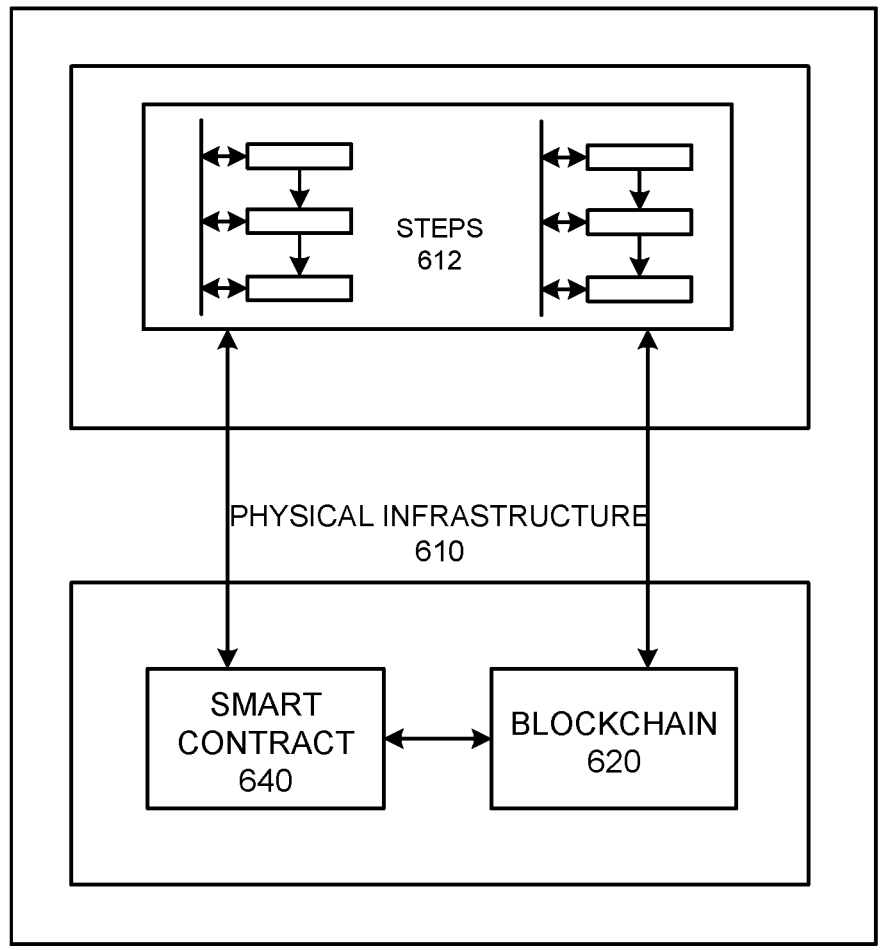
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
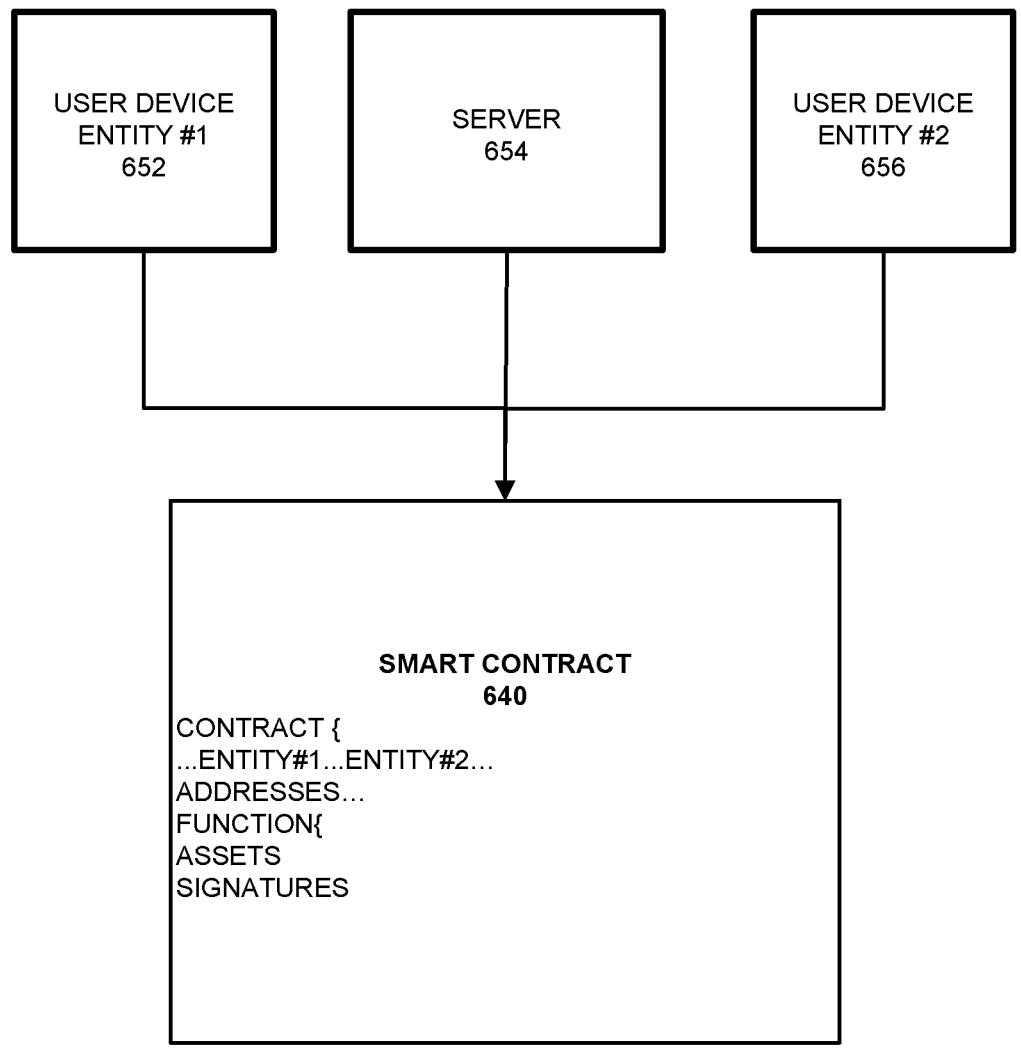
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
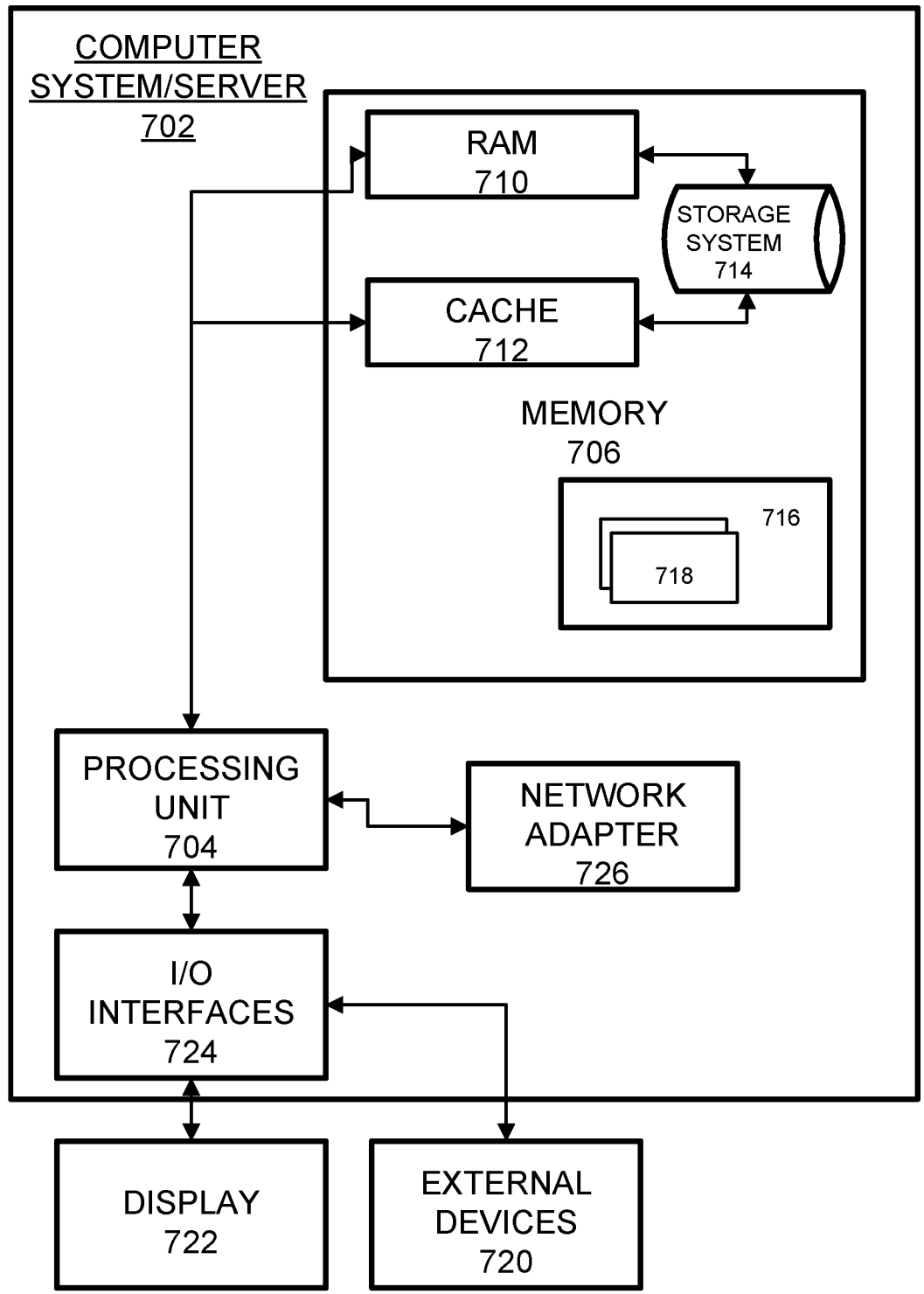
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to:

microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    querying a blockchain for blocks of the blockchain which are stored by a blockchain network that includes a plurality of mining pools;
    reading a plurality of memory pools of the plurality of mining pools to identify uncommitted blockchain transactions that are waiting to be added to the blockchain;
    determining that blockchain transactions of a user are not distributed proportionally across the plurality of mining pools based on committed blockchain transactions stored in the queried blocks and the uncommitted blockchain transactions identified from the reading of the plurality of memory pools of the plurality of mining pools;
    identifying a mining pool that the user has an abnormal relationship with from among the plurality of mining pools based on a rate of transactions of the user that are included in blocks by the identified mining pool; and
    storing information about the user with the abnormal relationship in the blockchain;
    wherein respective hash power shares of the plurality of mining pools of the blockchain network are determined based on content of the queried blocks, wherein the determining that blockchain transactions of the user are not distributed proportionally is further performed based on the determined hash power shares of the plurality of mining pools.

2. The method of claim 1, wherein the querying comprises querying a blockchain ledger for all blockchain transactions that are stored in a most recent predetermined number of committed blocks.

3. The method of claim 1, further comprising converting a blockchain address of the user into a name based on web scraping of content associated with the user.

4. The method of claim 1, further comprising accessing an address—entity identity matching table to determine an identity of the user.

5. The method of claim 4, further comprising generating the address—entity identity matching table by processing information from a plurality of digital media sources including at least one social media source to determine users associated with addresses included in the transactions.

6. A system, comprising:
a processor configured to:
- query a blockchain for blocks of the blockchain which are stored by a blockchain network comprising a plurality of mining pools;
- read a plurality of memory pools of the plurality of mining pools to identify uncommitted blockchain transactions that are waiting to be added to the blockchain;
- determine that blockchain transactions of a user are not distributed proportionally across the plurality of mining pools based on committed blockchain transactions stored in the queried blocks and the uncommitted blockchain transactions identified from the reading of the plurality of memory pools of the plurality of mining pools;
- identify a mining pool that the user has abnormal relationship with from among the plurality of mining pools based on a rate of transactions of the user that are included in blocks by the identified mining pool; and
- store information about the user with the abnormal relationship in the blockchain;
- wherein respective hash power shares of the plurality of mining pools of the blockchain network are determined based on content of the queried blocks, wherein the determine that blockchain transactions of the user are not distributed proportionally is further performed based on the determined hash power shares of the plurality of mining pools.

7. The system of claim 6, wherein the processor is configured to query a blockchain ledger for all blockchain transactions that are stored in a most recent predetermined number of committed blocks.

8. The system of claim 6, wherein the processor is further configured to convert a blockchain address of the user into a name based on web scraping of content associated with the user.

9. The system of claim 6, wherein the processor is further configured to access an address—entity identity matching table to determine an identity of the user.

10. The system of claim 9, further comprising a web scraping service that generates the address—entity identity matching table by processing information from a plurality of digital media sources including at least one social media source to determine users associated with addresses of transactions.

11. A non-transitory computer readable medium comprising instructions, that when read by a processor, cause the processor to perform:
- querying a blockchain for blocks of the blockchain which are stored by a blockchain network that includes a plurality of mining pools;
- reading a plurality of memory pools of the plurality of mining pools to identify uncommitted blockchain transactions that are waiting to be added to the blockchain;
- determining that blockchain transactions of a user are not distributed proportionally across the plurality of mining pools based on committed blockchain transactions stored in the queried blocks and the uncommitted blockchain transactions identified from the reading of the plurality of memory pools of the plurality of mining pools;
- identifying a mining pool that the user has an abnormal relationship with from among the plurality of mining pools based on a rate of transactions of the user that are included in blocks by the identified mining pool;
- storing information about the user with the abnormal relationship in the blockchain;
- wherein respective hash power shares of the plurality of mining pools of the blockchain network are determined based on content of the queried blocks, wherein the determining that blockchain transactions of the user are not distributed proportionally is further performed based on the determined hash power shares of the plurality of mining pools.

* * * * *